3,401,120
CORROSION INHIBITORS

Max Eugene Chiddix and Robert W. Wynn, Easton, Pa., and Edward O. Leonard, Bound Brook, N.J., assignors to GAF Corporation, a corporation of Delaware
No Drawing. Filed Oct. 23, 1965, Ser. No. 504,056
11 Claims. (Cl. 252—146)

This invention pertains to organic esters of acetylenic alcohols which are of value in corrosion inhibition. Such compounds find immediate and practical utility in inhibiting the corrosive effect of aqueous acid solutions.

Aqueous solutions of strong inorganic and organic non-oxidizing acids such as hydrochloric, sulfuric, phosphoric, hydrofluoric, citric, oxalic, sulfamic, etc., acids are used in many industrial processes where they may come in contact with corrodible metals, in particular, ferrous and related metals, that is, iron, nickel, steel, ferrous alloys, etc. In some situations, such as in oil-well treating, the contact takes place at elevated temperatures, approaching the boiling point of water at the pressure involved.

In almost all of the aforesaid operations, it is usually necessary to incorporate a corrosion inhibitor into the acid solution to prevent or decrease the attack of the acid upon the base metal. In order for a corrosion inhibitor to be considered an effective candidate for incorporation into an aqueous acid solution it should retard corrosion as evidenced by a smaller weight loss or visual observation of less corrosion of the base metal or by later evolution of hydrogen.

The compositions to which this invention is directed may be considered to be ester derivatives of propargyl and related acetylenic alcohols. Although propargyl alcohol has been used to inhibit the hydrochloric acid utilized in oil well acidization, it is less effective in the deeper wells due to the higher temperatures encountered (above 200° F. and higher).

In this invention the compounds used to inhibit corrosion by aqueous acid solutions correspond to Formula I or II as shown below:

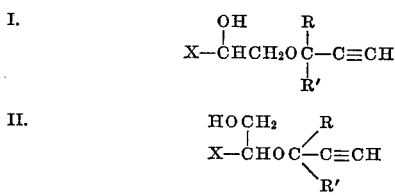

In these formulae R and R' are hydrogen or alkyl groups of 1 to 6 carbon atoms and X is hydrogen, R, ROH, OR, phenyl, phenyl substituted R, R substituted phenyl, OR substituted phenyl or OR substituted R, with the proviso that one of X, R or R' is other than hydrogen.

The ether compounds according to this invention may be made by the reaction of propargyl alcohol or a suitable derivative of propargyl alcohol with a suitable epoxy or similar compound having a reactive oxygen in a heterocyclic ring. When the reaction is base catalyzed, compounds of the formula type I are produced, while acid catalysis gives type II compounds.

Among the acetylenic starting materials which may be used are propargyl alcohol, 3,5-dimethyl-1-hexyn-3-ol 3-methyl-1-butyn-3-ol, etc., conforming to the formula:

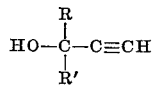

Epoxy starting materials include propylene oxide, butylene oxide, butylene-1,2-epoxide, styrene oxide and in some cases ethylene oxide. Of these, styrene oxide is preferred as a starting material to give the most effective corrosion inhibitor. Of the catalysts which may be used in the reaction to form the compounds of interest, Friedel-Crafts-type catalysts, in particular, $BF_3$, may be employed for production of type II compounds while base catalysis appears to be best performed using strong solid ion-exchange type bases, among which the quaternary ammonium-containing resins, in the hydroxyl form, are preferred.

The following examples of compounds manufactured according to this invention are to be considered illustrative only and not limiting.

Example I

To a flask, there was charged 72.8 grams (1.3 moles) propargyl alcohol and 0.5 mole boron trifluoride etherate. From a dropping funnel there was added 120.0 grams (1.0 mole) of styrene oxide at such a rate as to maintain the temperature of the reaction at 65–70° C. without external heating or cooling. The time required was 2 hours. The temperature was then maintained at 75° C. for one hour longer.

The catalyst was neutralized with 2.5 moles of 2-normal sodium methylate in methanol and the product recovered by distillation. After a forerun there was obtained a heart cut of 50 grams of product boiling at 107–108° C. at 0.2 mm. Hg pressure. The refractive index at 25° C. was 1.5310.

| Analysis | Found | Calculate |
|---|---|---|
| $C_{11}H_{12}O_2$, percent OH | 8.10 | 9.6 |
| Acetylenic Hydrogen, m./g | .00564 | .00568 |

The compound was named beta-(2-propynyloxy)-phenethyl alcohol.

Example II

To a flask there was charged 168.0 grams (3 moles) propargyl alcohol and 0.5 mole boron trifluoride etherate. At 35° C., in 6 hours, there was added 58.0 grams (1 mole) propylene oxide from a dropping funnel. The cataylst was neutralized with 1.5 cc. 5.7-normal sodium methylate in methanol. The volatile material was stripped off under aspiration vacuum to 65° pot temperature. The residue was filtered. Yield=91.5 grams (79% of theory) of 2-(2-propynyloxy)-n-propanol.

| Analysis | Found | Calculated |
|---|---|---|
| $C_6H_{10}O_2$, percent OH | 12.98 | 14.9 |
| Acetylenic Hydrogen, m./g | .00781 | .00877 |

Example III

In a manner similar to the above, butylene oxide was reacted with propargyl alcohol to yield 2-(2-propynyloxy)-butanol in 91% yield.

| Analysis | Found | Calculated |
|---|---|---|
| $C_7H_{12}O_2$, percent OH | 13.44 | 13.2 |
| Acetylenic Hydrogen, m./g | .00731 | .00781 |

Example IV

To a charge of 112.0 gram (2 moles) of propargyl alcohol was added 59.0 gram Amberlite IRA–400 (OH form). The temperature increased from 24° to 32° C., 288.0 gram (2.4 moles) styrene oxide was added without exotherm. The reaction mixture was heated to 70° C. for 4 hours, then to 80° for 8 hours. After cooling to room temperature the catalyst was removed by filtration. Volatiles were removed from the filtrate under aspirator vacuum and the residue distilled. There was obtained 60.8 grams of product [alpha-(2-propynyloxymethyl)-benzyl alcohol] boiling at 129° at 1.0 mm. Hg pressure, $n_D^{25}$=1.5340.

| Analysis | Found | Calculated |
|---|---|---|
| $C_{11}H_{12}O_2$, percent OH | 11.87 | 9.6 |
| Acetylenic Hydrogen, m./g. | .00484 | .00568 |

Example V

Into an autoclave was charged 336.0 grams (6.0 moles) of propargyl alcohol and 131.0 grams Amberlite IRA–400 dry OH form which had previously been soaked in propargyl alcohol and drained. The autoclave was purged at 100 p.s.i.g. three times with nitrogen. 6.0 moles of liquid butylene-1,2-epoxide was slowly introduced at 25° C. at 10 p.s.i.g. The mixture was held at 25 to 27° C. at 10 to 44 p.s.i.g. The resin was removed by filtration and the filtrate degassed with nitrogen for 2 hours at room temperature. The volatiles were removed under aspirator vacuum up to 96° pot temperature. The residue was a light amber liquid. This was filtered to remove some cloudiness from the 2-hydroxybutylpropargyl ether.

Example VI

There was charged to a flask 90.0 grams of glycidylpropargyl ether and 300.0 cc. distilled water. The mixture was heated on a steam bath for 3 hours. The cooled, slightly cloudy solution was filtered. The water was flash evaporated and the residue dried at 3 mm. Hg pressure at room temperature. The product monopropargylglycerol ether weighed 81 grams.

| Analysis | Found | Calculated |
|---|---|---|
| $C_6H_{10}O_3$, percent OH | 26.73 | 26.2 |
| Epoxide, m./g. | .000304 | 0 |

Example VII

Three-tenths of a mole of styrene oxide was treated with 0.9 mole of 3,5-dimethyl-1-hexyn-3-ol as in Example I. There was isolated 34.9 grams of a reaction product which has an assay of 91% based on hydroxyl.

Example VIII

One and eight-tenth moles of 3-methyl-1-pentyn-3-ol was treated with 0.6 mole of styrene oxide as in Example I. There was obtained 70.9 grams of reaction product which had an assay of 94%.

Example IX

One and eight-tenth moles of 3-methyl-1-butyn-3-ol was treated with 0.6 mole of styrene oxide as in Example I. There was obtained 88.1 grams of reaction product which had an assay of 87%.

The compounds aforesaid correspond to Formulas I and II according to the following Table I.

TABLE I

| Example | Name | Formula Type | X | R | $R_1$ |
|---|---|---|---|---|---|
| I | β-(2-propynyloxy)-phenethyl alcohol | II |  | H | H |
| II | 2(2-propynyloxy)-n-propanol | II | $CH_3$ | H | H |
| III | 2(2-propynyloxy)-butanol | II | $C_2H_5$ | H | H |
| IV | α-(2-propynyloxymethyl)-benzyl alcohol | I |  | H | H |
| V | 2-hydroxybutyl-propargyl ether | I | $C_2H_5$ | H | H |
| VI | Monopropargyl glycerol ether | I | $CH_2OH$ | H | H |
| VII | | II |  | $CH_3$ | Iso-$C_4H_9$ |
| VIII | | II |  | $CH_3$ | $C_3H_7$ |
| IX | | II | 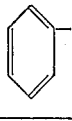 | $CH_3$ | $C_2H_5$ |

The aqueous acid solutions with which the present corrosion inhibitors are effective will generally contain about 1–50% acid, more usually about 5 or 10 to 25% acid by weight of the aqueous solution. To such solutions the corrosion inhibitors may be added in amounts sufficient to inhibit corrosion, say about 0.5 to 10% by weight, inhibitor, based on the acid, advantageously about 1–5% inhibitor.

The products obtained as described above were tested for their corrosion inhibiting effects. In these tests a mild steel coupon of API-J-55 grade, 1¼″ x 1¼″ x 3⁄16″ (actually a segment of pipe) weighing about 40 grams is immersed in 50 cc. of a test solution which comprises 15% aqueous HCl containing about 0.25 gram of the test compound. The solution is contained in a wide (2″) mouth 8 ounce jar measuring about 5.5″ high covered with a watch glass and held at 200° F.

Table II, below, reports on the results obtained using styrene oxide derivatives of propargyl alcohol as a corrosion inhibitor, both the acid catalyzed formula type II derivative of Example I and the formula type I, base-catalyzed derivative of Example IV. In the test results, weight loss is given in terms of milligrams lost in 16 hours. In the visual test, the results reported are the number of hours which elapsed before corrosion and darkening of the test solution could be observed by eye and in the hydrogen evolution test the results are reported in terms of the number of hours which elapsed before hydrogen evolution caused the watch glass cover to rock.

TABLE II.—TEST

| Additive | Weight Loss, milligrams | Visual hours | H₂ Evolution, hours |
|---|---|---|---|
| None | | 0 | 0 |
| Propargyl alcohol | 56 | 20 | 7.0 |
| Beta-(2-propynyloxy)-phenethyl alcohol | 36 | 27.5 | |
| Alpha-(2-propynyloxymethyl)-benzyl alcohol | 23 | | 8.0 |

The compounds prepared in Examples II, III and V to IX also were tested as above and all showed corrosion inhibiting ability.

What is claimed is:

1. A composition consisting essentially of a normally corrosive aqueous solution containing about 1–50% of a non-oxidizing acid having dissolved therein a corrosion inhibiting amount of a compound selected from the group consisting of:

I.
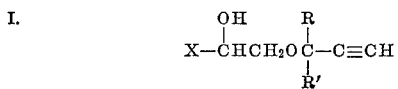

and

II.
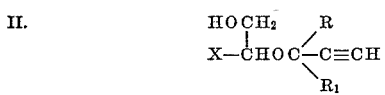

where R and R' are hydrogen or alkyl of 1–6 carbon atoms, and X is phenyl, phenyl-substituted R, R-substituted phenyl or OR-substituted phenyl.

2. The composition of claim 1 where the acid is inorganic.
3. The composition of claim 2 where the acid is selected from the group consisting of hydrofluoric, phosphoric, sulfuric and hydrochloric acid.
4. The composition of claim 1 where the acid is organic.
5. The composition of claim 4 where the acid is selected from the group consisting of sulfamic, oxalic and citric acids.
6. The composition of claim 1 where the solution contains about 10–25% acid.
7. The composition of claim 1 containing about 0.5–10% by weight corrosion inhibitor, based on the weight of the acid.
8. The composition of claim 8 containing about 1–5% inhibitor.
9. The derivatives of propargyl alcohol corresponding to the formula:

I.
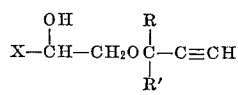

or

II.
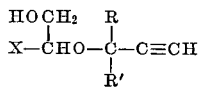

where R and R' are hydrogen or alkyl of 1–6 carbon atoms, and X is phenyl, phenyl-substituted R, R-substituted phenyl or OR-substituted phenyl.

10. A compound according to claim 9 in which X is phenyl.
11. A method for inhibiting the corrosive effects of an aqueous solution of strong non-oxidizing acid which comprises providing in said solution a corrosion inhibiting amount of the compound of claim 10.

References Cited

UNITED STATES PATENTS

| | | | |
|---|---|---|---|
| 2,778,855 | 1/1957 | Shokal et al. | 260—615 |
| 2,802,878 | 8/1957 | Monroe et al. | 252—396 |
| 2,993,864 | 7/1961 | Monroe et al. | 252—146 |
| 3,030,311 | 4/1962 | Oakes | 252—146 |

LEON D. ROSDOL, *Primary Examiner.*

W. E. SCHULZ, *Assistant Examiner.*